United States Patent
Burr et al.

(10) Patent No.: US 9,798,985 B2
(45) Date of Patent: Oct. 24, 2017

(54) APPARATUS AND METHODS FOR PROVIDING JOURNEY INFORMATION

(75) Inventors: Jonathan Charles Burr, Cheshire (GB); Gary Gates, Wirral (GB); Alan George Slater, Bolton (GB)

(73) Assignee: INRIX HOLDINGS LIMITED, Altrincham (GB)

( * ) Notice: Subject to any disclaimer, the term of this patent is extended or adjusted under 35 U.S.C. 154(b) by 308 days.

(21) Appl. No.: 13/147,540

(22) PCT Filed: Jan. 29, 2010

(86) PCT No.: PCT/GB2010/000158
§ 371 (c)(1),
(2), (4) Date: Oct. 17, 2011

(87) PCT Pub. No.: WO2010/086620
PCT Pub. Date: Aug. 5, 2010

(65) Prior Publication Data
US 2012/0036183 A1 Feb. 9, 2012

(30) Foreign Application Priority Data

Feb. 2, 2009 (GB) .................................. 0901588.4

(51) Int. Cl.
*G06F 15/16* (2006.01)
*G06Q 10/04* (2012.01)
(Continued)

(52) U.S. Cl.
CPC ........... *G06Q 10/047* (2013.01); *G01C 21/26* (2013.01); *G01C 21/343* (2013.01);
(Continued)

(58) Field of Classification Search
CPC .. G01C 21/26; G01C 21/343; G01C 21/3453; G06Q 10/109; G06Q 10/1093; G06Q 10/1095
(Continued)

(56) References Cited

U.S. PATENT DOCUMENTS 4,361,202 A 11/1982 Minovitch
4,985,705 A 1/1991 Stammler
(Continued)

FOREIGN PATENT DOCUMENTS

CA 2 434 707 A1 3/2004
DE 33 46 548 A1 7/1985
(Continued)

OTHER PUBLICATIONS

R. Sankar et al., "Intelligent Traffic Monitoring System Using Wireless Cellular Communications," © 1997 IEEE.
(Continued)

*Primary Examiner* — James Conaway
(74) *Attorney, Agent, or Firm* — Cooper Legal Group, LLC (57) ABSTRACT

A method of providing at least one journey option computation to user and a journey information computer system is provided. The journey information computer system comprising: a client interface configured to receive a calendar email invitation comprising appointment details and user identity information; a decode module operable to identify and extract the user identity information and the appointment details from the email; a travel information processor configured to compute at least one journey option based on the appointment details together with data received from a least one travel information source; and a communication module configured to send the at least one computed journey option to a user device.

46 Claims, 2 Drawing Sheets

(51) Int. Cl.
*G01C 21/26* (2006.01)
*G01C 21/34* (2006.01)
*G06Q 10/10* (2012.01)

(52) U.S. Cl.
CPC ......... *G01C 21/3453* (2013.01); *G06Q 10/04* (2013.01); *G06Q 10/109* (2013.01)

(58) Field of Classification Search
USPC ........................................................ 709/203
See application file for complete search history.

(56) References Cited

U.S. PATENT DOCUMENTS

| | | |
|---|---|---|
| 5,122,959 A | 6/1992 | Nathanson et al. |
| 5,131,020 A | 7/1992 | Liebesny et al. |
| 5,182,555 A | 1/1993 | Sumner |
| 5,187,810 A | 2/1993 | Yoneyama et al. |
| 5,272,638 A | 12/1993 | Martin et al. |
| 5,327,144 A | 7/1994 | Stilp et al. |
| 5,343,906 A | 9/1994 | Tibbals, III |
| 5,428,545 A | 6/1995 | Maegawa et al. |
| 5,432,842 A | 7/1995 | Kinoshita et al. |
| 5,438,517 A | 8/1995 | Sennott |
| 5,465,088 A | 11/1995 | Braegas |
| 5,465,289 A | 11/1995 | Kennedy, Jr. |
| 5,523,950 A | 6/1996 | Peterson |
| 5,539,645 A | 7/1996 | Mandhyan et al. |
| 5,543,789 A | 8/1996 | Behr et al. |
| 5,543,802 A | 8/1996 | Villevieille et al. |
| 5,559,864 A | 9/1996 | Kennedy, Jr. |
| 5,613,205 A | 3/1997 | Dufour |
| 5,689,252 A | 11/1997 | Ayanoglu et al. |
| 5,724,243 A | 3/1998 | Westerlage |
| 5,732,383 A | 3/1998 | Foladare et al. |
| 5,740,166 A | 4/1998 | Ekemark et al. |
| 5,745,865 A | 4/1998 | Rostoker et al. |
| 5,751,245 A | 5/1998 | Janky et al. |
| 5,774,827 A | 6/1998 | Smith et al. |
| 5,801,943 A | 9/1998 | Nasburg |
| 5,839,086 A | 11/1998 | Hirano |
| 5,845,227 A | 12/1998 | Peterson |
| 5,880,958 A | 3/1999 | Helms et al. |
| 5,933,100 A | 8/1999 | Golding |
| 5,948,042 A | 9/1999 | Heimann et al. |
| 5,959,568 A | 9/1999 | Woolley |
| 6,012,012 A | 1/2000 | Fleck et al. |
| 6,038,444 A | 3/2000 | Schipper et al. |
| 6,098,016 A | 8/2000 | Ishihara |
| 6,128,571 A | 10/2000 | Ito et al. |
| 6,161,071 A | 12/2000 | Shuman et al. |
| 6,178,374 B1 | 1/2001 | Mohlenkamp et al. |
| 6,219,793 B1 | 4/2001 | Li et al. |
| 6,230,011 B1 | 5/2001 | Guenther et al. |
| 6,236,932 B1 | 5/2001 | Fastenrath |
| 6,236,933 B1 | 5/2001 | Lang |
| 6,240,364 B1 | 5/2001 | Kerner et al. |
| 6,256,577 B1 | 7/2001 | Graunke |
| 6,263,205 B1 | 7/2001 | Yamaura et al. |
| 6,288,676 B1 | 9/2001 | Maloney |
| 6,314,360 B1 | 11/2001 | Becker |
| 6,317,686 B1 | 11/2001 | Ran |
| 6,341,255 B1 | 1/2002 | Lapidot |
| 6,401,027 B1 | 6/2002 | Xu et al. |
| 6,401,037 B1 | 6/2002 | Muller et al. |
| 6,411,895 B1* | 6/2002 | Lau et al. .................. 701/425 |
| 6,411,897 B1 | 6/2002 | Gaspard, II |
| 6,424,838 B1 | 7/2002 | Stobbe et al. |
| 6,430,496 B1 | 8/2002 | Smith et al. |
| 6,438,561 B1 | 8/2002 | Israni et al. |
| 6,466,862 B1 | 10/2002 | DeKock et al. |
| 6,480,783 B1 | 11/2002 | Myr |
| 6,490,519 B1 | 12/2002 | Lapidot et al. |
| 6,532,414 B2 | 3/2003 | Mintz |
| 6,545,637 B1 | 4/2003 | Krull |
| 6,587,781 B2 | 7/2003 | Feldman et al. |
| 6,594,577 B2 | 7/2003 | Nakajima et al. |
| 6,606,494 B1 | 8/2003 | Arpee et al. |
| 6,618,650 B1 | 9/2003 | Nakai et al. |
| 6,708,036 B2 | 3/2004 | Proctor et al. |
| 6,711,404 B1 | 3/2004 | Arpee et al. |
| 6,718,425 B1 | 4/2004 | Pajakowski et al. |
| 6,792,263 B1 | 9/2004 | Kite |
| 6,799,046 B1 | 9/2004 | Tang |
| 6,842,620 B2 | 1/2005 | Smith et al. |
| 6,882,930 B2 | 4/2005 | Trayford et al. |
| 6,911,918 B2 | 6/2005 | Chen |
| 6,922,629 B2 | 7/2005 | Yoshikawa et al. |
| 6,931,309 B2 | 8/2005 | Phelan et al. |
| 6,947,833 B2 | 9/2005 | Kita et al. |
| 6,952,643 B2 | 10/2005 | Matsuoka et al. |
| 6,989,765 B2 | 1/2006 | Gueziec |
| 7,027,819 B2 | 4/2006 | Ozturk et al. |
| 7,031,983 B2 | 4/2006 | Israni et al. |
| 7,046,691 B1* | 5/2006 | Kadyk et al. .................. 370/466 |
| 7,062,379 B2 | 6/2006 | Videtich |
| 7,085,649 B2 | 8/2006 | Baur et al. |
| 7,107,038 B2 | 9/2006 | Fitch et al. |
| 7,155,376 B2 | 12/2006 | Yang et al. |
| 7,243,134 B2 | 7/2007 | Bruner et al. |
| 7,246,007 B2 | 7/2007 | Ferman et al. |
| 7,343,242 B2 | 3/2008 | Breitenberger et al. |
| 7,383,438 B2 | 6/2008 | Fahrny et al. |
| 7,444,237 B2 | 10/2008 | Dale |
| 7,620,402 B2 | 11/2009 | Feldman et al. |
| 7,986,954 B1 | 7/2011 | Steer |
| 8,024,111 B1* | 9/2011 | Meadows et al. ............ 701/414 |
| 8,423,577 B1* | 4/2013 | Lee et al. ...................... 707/793 |
| 2001/0018628 A1 | 8/2001 | Jenkins et al. |
| 2001/0029425 A1 | 10/2001 | Myr |
| 2001/0034577 A1 | 10/2001 | Grounds et al. |
| 2001/0037174 A1 | 11/2001 | Dickerson |
| 2001/0049637 A1* | 12/2001 | Tso .................. G06Q 30/02 705/26.8 |
| 2002/0009184 A1 | 1/2002 | Shnier |
| 2002/0026278 A1 | 2/2002 | Feldman et al. |
| 2002/0030698 A1* | 3/2002 | Baur et al. .................. 345/733 |
| 2002/0049630 A1 | 4/2002 | Furuta et al. |
| 2002/0055818 A1 | 5/2002 | Gaspard |
| 2002/0120390 A1 | 8/2002 | Bullock |
| 2002/0131565 A1* | 9/2002 | Scheuring et al. ........ 379/88.19 |
| 2002/0198694 A1 | 12/2002 | Yang et al. |
| 2003/0003918 A1 | 1/2003 | Proctor et al. |
| 2003/0040944 A1 | 2/2003 | Hileman |
| 2003/0069683 A1 | 4/2003 | Lapidot et al. |
| 2003/0096620 A1 | 5/2003 | Ozturk et al. |
| 2003/0135304 A1 | 7/2003 | Sroub et al. |
| 2003/0219024 A1 | 11/2003 | Purnadi et al. |
| 2003/0236818 A1 | 12/2003 | Bruner et al. |
| 2004/0076279 A1 | 4/2004 | Taschereau |
| 2004/0082312 A1 | 4/2004 | O'Neill et al. |
| 2004/0088362 A1* | 5/2004 | Curbow et al. ............... 709/207 |
| 2004/0111214 A1 | 6/2004 | Buecher et al. |
| 2004/0230636 A1* | 11/2004 | Masuoka et al. ............ 708/800 |
| 2004/0243285 A1 | 12/2004 | Gounder |
| 2005/0026619 A1 | 2/2005 | Jha |
| 2005/0065682 A1 | 3/2005 | Kapadia et al. |
| 2005/0192031 A1 | 9/2005 | Vare |
| 2006/0009885 A1 | 1/2006 | Raines et al. |
| 2006/0025158 A1 | 2/2006 | Leblanc et al. |
| 2006/0041518 A1* | 2/2006 | Blair .................... G06F 17/227 705/80 |
| 2007/0016646 A1* | 1/2007 | Tendjoukian et al. ........ 709/206 |
| 2007/0060108 A1 | 3/2007 | East et al. |
| 2007/0106465 A1 | 5/2007 | Adam et al. |
| 2007/0220063 A1* | 9/2007 | O'Farrell .............. G06F 17/277 |
| 2008/0004794 A1* | 1/2008 | Horvitz .............. G01C 21/3492 701/414 |
| 2008/0086455 A1* | 4/2008 | Meisels et al. .................... 707/3 |
| 2008/0208451 A1 | 8/2008 | Minami |
| 2008/0214192 A1 | 9/2008 | Soliman |
| 2008/0281665 A1* | 11/2008 | Opaluch ......................... 705/9 |
| 2009/0036148 A1 | 2/2009 | Yach |
| 2009/0177484 A1* | 7/2009 | Davis et al. ...................... 705/1 |

(56) References Cited

U.S. PATENT DOCUMENTS

| | | | | |
|---|---|---|---|---|
| 2009/0216633 | A1* | 8/2009 | Whitsett | G06Q 30/02 705/14.36 |
| 2010/0010739 | A1 | 1/2010 | Tsushima | |
| 2010/0106627 | A1* | 4/2010 | O'Sullivan | G06Q 10/109 705/30 |
| 2010/0125478 | A1* | 5/2010 | Bisht | 705/8 |
| 2010/0280748 | A1* | 11/2010 | Mundinger et al. | 701/200 |
| 2011/0125545 | A1* | 5/2011 | Lehmann et al. | 705/7.24 |
| 2012/0166565 | A1* | 6/2012 | Hardy | G06Q 10/109 709/206 |

FOREIGN PATENT DOCUMENTS

| | | |
|---|---|---|
| DE | 40 05 803 A1 | 8/1990 |
| DE | 42 41 408 A1 | 6/1994 |
| DE | 195 25 291 C1 | 12/1996 |
| DE | 196 38 798 A1 | 3/1998 |
| DE | 196 51 146 A1 | 6/1998 |
| DE | 197 55 875 A1 | 6/1998 |
| DE | 199 17 154 A1 | 10/2000 |
| DE | 199 33 639 A1 | 1/2001 |
| DE | 199 48 416 A1 | 4/2001 |
| DE | 100 63 588 A1 | 7/2001 |
| DE | 100 37 827 A1 | 2/2002 |
| DE | 102005009604 A1 | 9/2006 |
| DE | 102006033744 A1 | 1/2008 |
| EP | 0 365 097 A1 | 4/1990 |
| EP | 0 372 840 A2 | 6/1990 |
| EP | 0 715 285 A1 | 6/1996 |
| EP | 0 715 286 A1 | 6/1996 |
| EP | 0 715 288 A1 | 6/1996 |
| EP | 0 715 291 A1 | 6/1996 |
| EP | 0 763 807 A1 | 3/1997 |
| EP | 0 834 840 A1 | 4/1998 |
| EP | 0 838 663 A2 | 4/1998 |
| EP | 0 838 797 A1 | 4/1998 |
| EP | 0879459 A1 | 11/1998 |
| EP | 0879460 A1 | 11/1998 |
| EP | 0 921 509 A2 | 6/1999 |
| EP | 0 936 590 A2 | 8/1999 |
| EP | 0951187 A1 | 10/1999 |
| EP | 1109121 A2 * | 6/2001 |
| EP | 1 162 560 A2 | 12/2001 |
| EP | 1 320 075 A2 | 6/2003 |
| EP | 1 387 333 A1 | 2/2004 |
| EP | 1 515 122 A1 | 3/2005 |
| EP | 1550842 A1 | 7/2005 |
| EP | 1576561 A2 | 9/2005 |
| EP | 1591980 A1 | 11/2005 |
| EP | 1600735 A1 | 11/2005 |
| EP | 1900588 A1 | 3/2008 |
| GB | 2431261 A | 4/2007 |
| JP | 1-137778 | 5/1989 |
| JP | 4-290098 | 10/1992 |
| JP | 5-46086 | 2/1993 |
| JP | 5-233996 | 9/1993 |
| JP | 6-12593 | 1/1994 |
| JP | 7-83685 | 3/1995 |
| JP | 8-129697 | 5/1996 |
| JP | 9-14986 | 1/1997 |
| JP | H0914986 A | 1/1997 |
| JP | H09113290 A | 5/1997 |
| JP | 2653282 B2 | 9/1997 |
| JP | H10300495 A | 11/1998 |
| JP | 11-25389 | 1/1999 |
| JP | 2927277 B2 | 7/1999 |
| JP | H11328571 A | 11/1999 |
| JP | 3052405 B2 | 6/2000 |
| JP | 2001-124569 | 5/2001 |
| JP | 3171031 B2 | 5/2001 |
| JP | 2001124569 A | 5/2001 |
| JP | 2002122437 A | 4/2002 |
| JP | 2002-206395 | 7/2002 |
| JP | 3353656 B2 | 12/2002 |
| JP | 3566503 B2 | 9/2004 |
| WO | WO 94/11839 | 5/1994 |
| WO | 9502307 A1 | 1/1995 |
| WO | WO 95/14292 | 5/1995 |
| WO | WO 96/10807 | 4/1996 |
| WO | WO 96/25830 | 8/1996 |
| WO | WO 96/29688 | 9/1996 |
| WO | 9642179 A1 | 12/1996 |
| WO | 9729470 A1 | 8/1997 |
| WO | 9729471 A1 | 8/1997 |
| WO | WO 97/29470 | 8/1997 |
| WO | WO 97/29471 | 8/1997 |
| WO | WO 97/31241 | 8/1997 |
| WO | 9737318 A1 | 10/1997 |
| WO | WO 97/36148 | 10/1997 |
| WO | WO 97/40606 | 10/1997 |
| WO | WO 98/15149 | 4/1998 |
| WO | WO 98/15935 | 4/1998 |
| WO | WO 98/23115 | 5/1998 |
| WO | WO 98/26395 | 6/1998 |
| WO | WO 98/29758 | 7/1998 |
| WO | WO 98/36397 | 8/1998 |
| WO | WO 98/42179 | 10/1998 |
| WO | WO 98/54682 | 12/1998 |
| WO | WO 99/63499 | 12/1999 |
| WO | WO 01/01367 A1 | 1/2001 |
| WO | WO 01/23835 A2 | 4/2001 |
| WO | WO 01/35370 A1 | 5/2001 |
| WO | WO 01/48725 A1 | 7/2001 |
| WO | WO 02/01158 A1 | 1/2002 |
| WO | WO 02/01532 A1 | 1/2002 |
| WO | WO 02/03350 A1 | 1/2002 |
| WO | WO 02/43026 A1 | 5/2002 |
| WO | WO 02/46868 * | 6/2002 |
| WO | WO 03/041030 A2 | 5/2003 |
| WO | WO 03/073048 A2 | 9/2003 |
| WO | 2004021305 A2 | 3/2004 |
| WO | WO 2004/086799 A1 | 10/2004 |
| WO | 2005098780 A1 | 10/2005 |
| WO | 2006000208 A1 | 1/2006 |
| WO | 2006005906 A1 | 1/2006 |
| WO | 2006025728 A1 | 3/2006 |
| WO | 2006073997 A1 | 7/2006 |
| WO | 2007103180 A2 | 9/2007 |
| WO | 2007149703 A2 | 12/2007 |
| WO | WO 2008/114369 A1 | 9/2008 |
| WO | 2008136576 A1 | 11/2008 |

OTHER PUBLICATIONS

K. Abe et al., "A Planning Method Combining Rule-Bases and Optimization Algorithms for Transportation Network," © 1992 IEEE.

"Data Fusion for Dynamic Route Guidance Systems," International Federation of Automatic Control (IFAC), 2361 Laxenburg, Schlossplatz 12, 1997.

N. Shamanesh, "Getting Drivers Out of a Jam," Automotive Engineer, Oct. 1999.

Wang et al., "An Unified Vehicle Supervising and Traffic Information System," © 1996 IEEE.

Fastenrath, Floating Car Data on a Larger Scale, Oct. 24, 1997.

J.J. Caffery et al., "Overview of Radiolocation in CDMA Cellular Systems," published 1998; See Chapter "Accuracy Requirement" pp. 7-8, <http://sss-mag.com/pdf/radioloc.pdf>.

International Search Report issued in International Patent Application No. PCT/GB2005/002637 dated Sep. 21, 2005.

Written Opinion of the International Searching Authority issued in International Patent Application No. PCT/GB2005/002637.

M. Westerman et al., "Integration of Probe Vehicle and Induction Loop Data—Estimation of Travel Times and Automatic Incident Detection," California PATH Research Report, Institute of Transportation Studies, Jan. 1, 1996.

"Grubbs Test for Outliers," Engineering Statistics Handbook, 2000.

Office Action issued in U.S. Appl. No. 11/269,908 dated Jan. 4, 2013.

(56) References Cited

OTHER PUBLICATIONS

Office Action issued in U.S. Appl. No. 11/269,908 dated Jun. 22, 2012.
Office Action issued in U.S. Appl. No. 10/999,994 dated Apr. 15, 2010.
Office Action issued in U.S. Appl. No. 10/999,994 dated Sep. 9, 2010.
Office Action issued in U.S. Appl. No. 11/280,833 dated Dec. 3, 2010.
Office Action issued in U.S. Appl. No. 11/269,908 dated Jul. 12, 2010.
Office Action issued in U.S. Appl. No. 11/280,833 dated Feb. 16, 2011.
Office Action issued in U.S. Appl. No. 11/269,908 dated Dec. 27, 2010.
Office Action issued in U.S. Appl. No. 11/269,908 dated Jun. 9, 2011.
Office Action issued in U.S. Appl. No. 10/999,994 dated Dec. 7, 2011.
Office Action issued in U.S. Appl. No. 10/999,994 dated Mar. 21, 2011.

\* cited by examiner

APPARATUS AND METHODS FOR PROVIDING JOURNEY INFORMATION

RELATED APPLICATIONS

This application is the U.S. National Phase under 35 U.S.C. §371 of International Application No. PCT/GB2010/000158, filed on Jan. 29, 2010, which in turn claims the benefit of British Application No. 0901588.4, filed on Feb. 2, 2009, the disclosures of which Applications are incorporated by reference herein.

TECHNICAL FIELD

This invention relates generally to apparatus and methods for providing journey information, and in particular to systems and methods for responding to user requests for journey information via an email application.

BACKGROUND

Traffic and travel information is important in calculating journey times and routes, as well as avoiding traffic congestion that can potentially delay route completion.

There are many different sources of traffic and travel information. Various online applications, for example Multimap.com and Google Maps, offer street-level maps and door-to-door travel directions, as well as aerial photographs and local information. Many public transport operators also provide journey scheduling information. Transport for London (TfL), for instance, offers an online journey planner which enables users to plan journeys by multiple modes of transport in and around London. There are also numerous sources of real-time traffic information which aim to keep travelers updated as to the current traffic situation.

However, these traffic information sources usually require a user to manually enter details about their journey. No currently known technology provides systems and methods suitable for automatically generating one or more journey options from a plurality of traffic information sources using appointment details extracted from an email.

SUMMARY OF THE INVENTION

According to one embodiment a journey information computer system is provided. The journey information computer system comprising: a client interface configured to receive a calendar email invitation comprising appointment details and user identity information; a decode module operable to identify and extract the user identity information and the appointment details from the email; a travel information processor configured to compute at least one journey option based on the appointment details together with data received from a least one travel information source; and a communication module configured to send the at least one computed journey option to a user device.

According to another embodiment the decode module is configured to process the appointment details to generate a travel information data packet comprising at least a starting point and finishing point for a journey, and the user identity information.

According to another embodiment the travel information processor receives the travel information data packet and uses it to compute the at least one journey.

According to another embodiment the system further comprises a library of user profiles, each user profile comprising an address, and wherein the decode module is configured to use the user identity information to look up said address from the user profile and define the journey starting point in the travel information data packet as said address.

According to another embodiment the address is one or more of a home address and a work address.

According to another embodiment the user is prompted to select between the home and work address.

According to another embodiment the appointment details comprise: date, time, duration and location.

According to another embodiment the decode module is configured to define the location from the appointment details as the finishing point for the journey.

According to another embodiment the decode module is configured to use the duration from the appointment details to calculate a return journey.

According to another embodiment the system further comprises a library of e-mail client templates, wherein each template describes the structure of appointment details in e-mails, and wherein the decode module uses the templates to selectively, in dependence upon the source of the calendar email invitation, identify and extract the appointment details from the e-mail.

According to another embodiment each user profile comprises more than one address and the user is prompted with a message to confirm the starting and/or ending point of the journey.

According to another embodiment each user profile further comprises preference information used by the travel information processor for journey computations.

According to another embodiment the preference information includes one or more of: preferred method of transport, cost preferences, environmental preferences.

According to another embodiment the user identifier is an e-mail address.

According to another embodiment the system further comprises an e-mailer module for creating an email message comprising details of the computed journey and sending it to the user device.

According to another embodiment the system further comprises a messenger module for creating a SMS/MMS message comprising details of the computed journey and sending it to the user device.

According to another embodiment the message comprises updates and/or reminders regarding the journey.

According to another embodiment the user device is one or more of: a desktop computer; a mobile phone; a smartphone; a PDA.

According to another embodiment the at least one travel information source includes one or more of: real-time traffic information; rail information; flight information; coach information; local taxi companies; public transport schedules.

According to another embodiment travel information is sent as regular updates to the user by the e-mailer module and/or messenger module before and/or during the journey.

According to another embodiment the travel information processor takes into consideration economic factors and outputs the most cost-effective journey to the user.

According to another embodiment the travel information processor takes into consideration environmental factors and outputs the most environmentally friendly journey to the user.

According to another embodiment the calculated journey option allows a predetermined amount of time for parking.

According to another embodiment the system further comprises an interface to at least one data store having records indicating parking availability in the vicinity of the end point, and presenting it as part of the journey option.

According to another embodiment the decode module sends an instruction to the e-mailer and/or messenger module to send a registration link back to the user, and the user completes profile information which is used to create/populate a user profile.

According to one embodiment a method of providing at least one journey option computation to user is provided. The method comprising: receiving an email at a decode module; extracting user identity information and appointment details from the email; receiving travel information from at least one travel information source; computing at least one journey option based on the appointment details and travel information using a travel information processor; sending the at least one computed journey to a user device.

According to another embodiment the method further comprises using the appointment details to generate a travel information data packet comprising at least a starting point and finishing point for a journey, and the user identity information.

According to another embodiment the method further comprises receiving the travel information data packet and using it in the computation of the at least one journey.

According to another embodiment the method further comprises using the user identity information to look up an address from a library of user profiles, each user profile comprising an address, and defining the journey starting point in the travel information data packet as said address.

According to another embodiment the appointment details comprise: date, time, duration and location.

According to another embodiment the method further comprises using the location as the finishing point for that journey.

According to another embodiment the method further comprises extracting the duration from the appointment details to calculate a return journey start time and calculating a return journey based on reversing the starting and finishing points.

According to another embodiment the method further comprises referencing a library of e-mail client templates, wherein each template describes where an e-mail client application places appointment details in e-mails, and using the templates to identify and extract the appointment details from the e-mail.

According to another embodiment each user profile comprises more than one address and the user is prompted with a message to confirm the starting and/or ending point of the journey.

According to another embodiment user profiles further comprise preference information used by the travel information processor for journey computations.

According to another embodiment preference information includes one or more of: preferred method of transport, cost preferences, environmental preferences.

According to another embodiment the user identifier is an e-mail address.

According to another embodiment the method further comprises creating an email message comprising the journey and sending it to the user device.

According to another embodiment the method further comprises creating a SMS/MMS message comprising the journey and sending it to the user device.

According to another embodiment the message comprises updates and/or reminders regarding the journey.

According to another embodiment the user device is one or more of: a desktop computer; a mobile phone, a smartphone, a PDA.

According to another embodiment at least one travel information source includes one or more of: real-time traffic information, rail information, flight information, coach information, local taxi companies, public transport schedules.

According to another embodiment the method further comprises sending regular traffic information updates to the user before and during the journey.

According to another embodiment the travel information processor takes into consideration economic factors and outputs the most cost-effective journey to the user.

According to another embodiment the travel information processor takes into consideration environmental factors and outputs the most environmentally friendly journey to the user.

According to another embodiment the calculated journey allows a predetermined amount of time for parking.

According to another embodiment the decode module sends an instruction to the e-mailer and/or messenger module to send a registration link back to the user, and the user completes profile information which is used to create/populate a user profile.

According to one embodiment a computer-readable medium encoded with a data structure configured to perform the above methods is provided.

Additional objects, advantages, and novel features of the invention will be set forth in part in the description that follows, and in part will become apparent to those skilled in the art upon examination of the following and the accompanying drawings, or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

Figure 1:
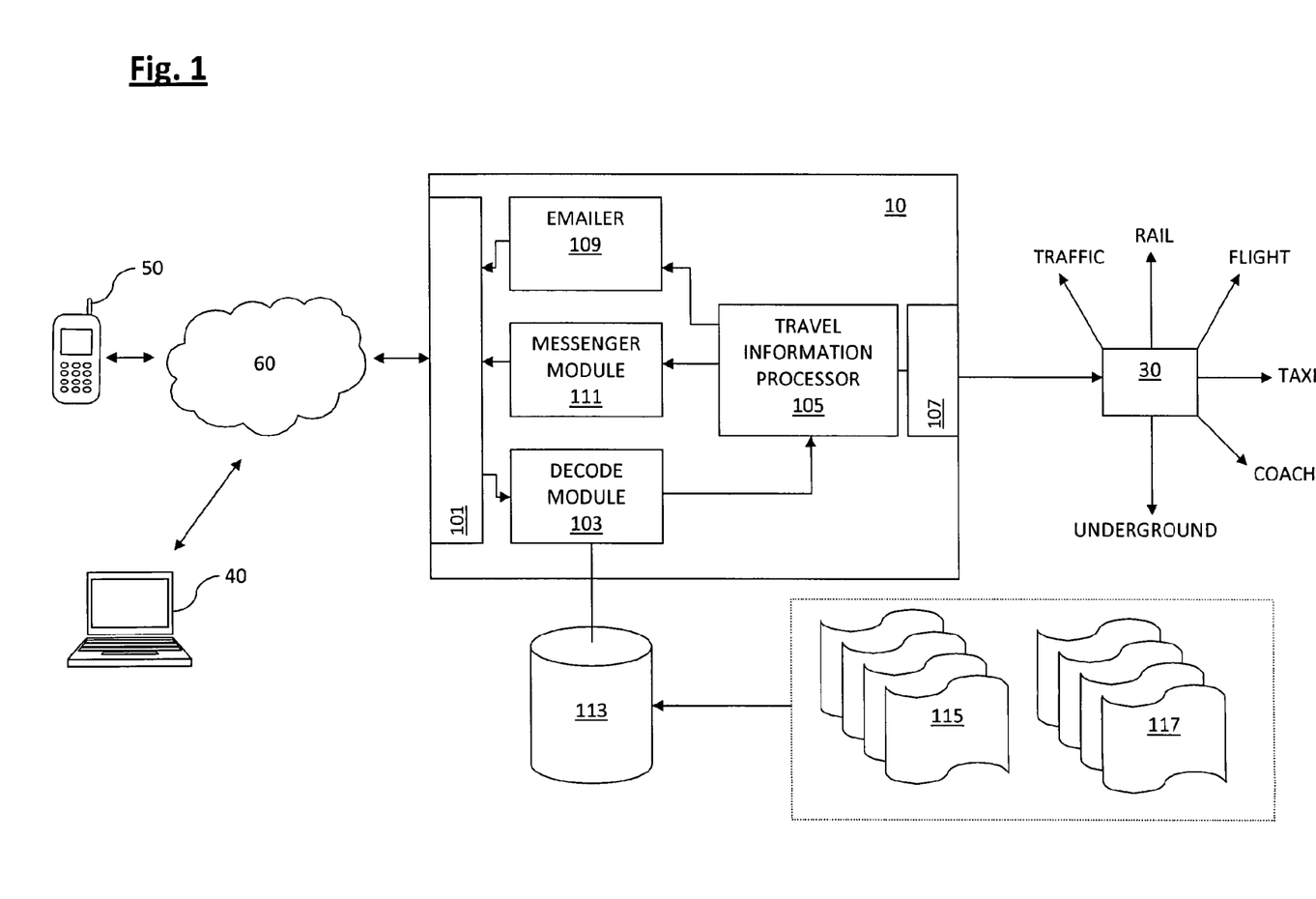
FIG. 1 illustrates a journey information computer system according to an embodiment of the present invention.

FIG. 1 shows a journey information computer system according to an embodiment of the present invention. The system comprises: a journey information server 10 with an interface to at least one travel information source 30, and one or more desktop computers 40 and/or mobile devices 50 in communication with server 10 via network 60.

The journey information server 10 comprises: a client interface 101, a decode module 103, a travel information processor 105, a travel information source interface 107 operable to connect to at the least one travel information source 30, an E-mailer module 109, a messenger module 111, and a database 113 comprising an archive of e-mail client templates 115 and an archive of user profiles 117.

Generally, an e-mail message sent from a desktop or mobile email client application ("email client") has a message body and a header which may include at least some of the following: the e-mail address/name of the sender; the e-mail address[es]/name[s] of the message recipient[s]; subject; date etc. Many e-mail clients have calendar/appointment functionality which enable the user to fill in appointment details—such as date, time and place—and send it to one are more recipients, whose own e-mail client may automatically add the appointment into its calendar when the user accepts the appointment, or who may manually enter information into their own calendar.

Popular e-mail client applications supported by the embodiments of the present invention include, for example, POP3 and IMAP4 clients such as Eudora, Lotus Notes, Apple Mail, Microsoft Office Outlook, Microsoft Outlook Express, Mozilla Thunderbird, Opera Mail and Pegasus Mail. Some embodiments also support e-mails composed in HTTP (webmail) applications such as Gmail, Hotmail, AOL and Yahoo. However, these examples are not to be construed as limiting and other email clients not mentioned may also be used.

In the context of the present invention, the term "e-mail" is used generically to describe an e-mail message comprising at least some appointment information, which may be contained within the header or body of the e-mail, or partly in each.

The client interface 101 is configured to receive e-mails from user email clients. Most typically, the email clients are operated remotely from a desktop computer 40, however, other electronic devices suitable for sending e-mails and scheduling may also be used, e.g. phones, smartphones, Blackberry's, PDAs etc.

According to embodiments of the present invention, the user enters the "server e-mail address" into the "to" or "cc" field when composing an e-mail to set up an appointment, or when composing a reply message accepting an invitation to attend a meeting. The "server e-mail address" is an additional recipient address which ensures that the e-mail is delivered to the interface 101 of the traffic information server 10 once it has been sent by the user's e-mail client.

The user profile archive 117 is a library of user profiles. An individual user can register an account and create a user profile in any suitable way, e.g. by visiting a registration website and filling in a registration form. A typical user profile comprises at least: a user identifier (such as name and e-mail address) and at least one address (e.g. home and/or office address). Optionally, user profiles include preference information (such as preferred methods of transport, cost preferences, environmental preferences etc.) and any other travel related information.

The decode module 103 is operable to receive e-mails from users via interface 101 and extract (a) user identity information (e.g. name, email address etc.) and (b) appointment details (e.g. date of appointment, time of appointment, appointment venue address etc.). The decode module 103 cross-references the user identity information extracted from the e-mail with user identifier(s) stored in user profiles in profile archive 117. Once the decode module finds the correct user profile, it uses the address defined in the profile or an alternative address defined in the e-mail, and the appointment details to generate a travel information data packet. Examples of appointment details used for travel information include attributes such as date, time, duration and location.

The travel information processor 105 receives appointment details and profile information from the decode module 103 in the form of a travel information data packet, and uses it to compute one or more journey options for the user. The user's address (home or office) looked up from the user profile is typically used as a starting point for a journey, unless an alternative is provided, and the location of the meeting extracted from the appointment details of the e-mail is typically used as the finishing point for that journey. According to one embodiment, the user is prompted to confirm the starting and finishing point of a journey, which may include indicating whether a journey starts from the home or office address. The travel information processor 105 then uses the starting point and finishing point to source information from one or more travel information sources 30 via interface 107.

According to one embodiment, the duration of the meeting may be used to calculate a return journey, in other words, a journey that starts after the end of the meeting and reverses the starting and finishing points of the outbound journey.

Travel information sources may include, but are not limited to, one or more of the following: real-time traffic reports, rail operator information, flight operator information, coach operator information, local taxi companies, public transport services such as buses and underground trains, and map information for walking routes.

According to one embodiment, at least one travel information source is one or more of: International Patent Publication No. WO04/021305 "APPARATUS AND METHOD FOR PROVIDING TRAFFIC INFORMATION"; U.S. Pat. No. 6,587,781 "METHOD AND SYSTEM FOR MODELING AND PROCESSING VEHICULAR TRAFFIC DATA AND INFORMATION AND APPLYING THEREOF"; International Patent Publication No. WO2006/005906 "METHOD & SYSTEM FOR MONITORING TRAFFIC"; and European Patent Publication No. EP1576561 "INSTANTANEOUS TRAFFIC MONITORING SYSTEM", the disclosures of which are incorporated herein by reference. If a user opts to travel by car, for example, this travel information source provides not only accurate journey planning information but up-to-date traffic reports, which can be sent as updates to the user by e-mailer 109 and/or messenger module 111 before and during the journey.

According to one embodiment, the travel information processor 105 takes into consideration economic factors and outputs the most cost-effective journey to the user. According to one embodiment, the travel information processor 105 takes into consideration environmental factors and outputs the most environmentally friendly journey to the user. According to one embodiment, when the journey is by car, calculated journey time may allow for a predetermined amount of time for parking. According to one embodiment, the server 10 further comprises an interface to at least one datastore having records indicating parking availability in the vicinity of the end point, e.g. records showing a list of nearby car parks, for example multi-storey car parks, or other information.

According to one embodiment, if the decode module 103 is not able to determine a match between user identity information contained in the e-mail and a user identifier stored in the user profile archive 117, an instruction is sent to the e-mailer module 109 and/or messenger module 111 to send a registration link back to the user. The user is then requested to complete profile information which is received by server 10 and a user profile is created/populated accordingly.

The template archive 115 is a library of templates, each of which describe how an e-mail client application constructs appointment e-mails, and they can be generated for any e-mail client application, including any of the ones listed above. For instance, the template representing the Lotus Notes application describes in which fields of the e-mail Lotus Notes places the time, the date, the duration and the location. Thus, the decode module 103 is able to use information stored in the templates to identify and extract relevant appointment information from incoming e-mails. According to one embodiment, the decode module 103 may have code which automatically detects appointment details from the body of an email. Examples of techniques to identify and extract information from emails in this manner will be known to the skilled person.

The e-mailer module 109 is operable to package journey information into an e-mail format that can be sent back to the user. In practice, it may be a server side e-mail client application configured to receive data from the travel information processor 105, appropriately package the data into a readable format, for instance HTML, and send it to the user's e-mail address. The messenger module 111 performs a similar function to the e-mailer module 109, however, journey information is packaged into a format suitable for sending to a mobile device, for example, into SMS/MMS format.

Figure 2:
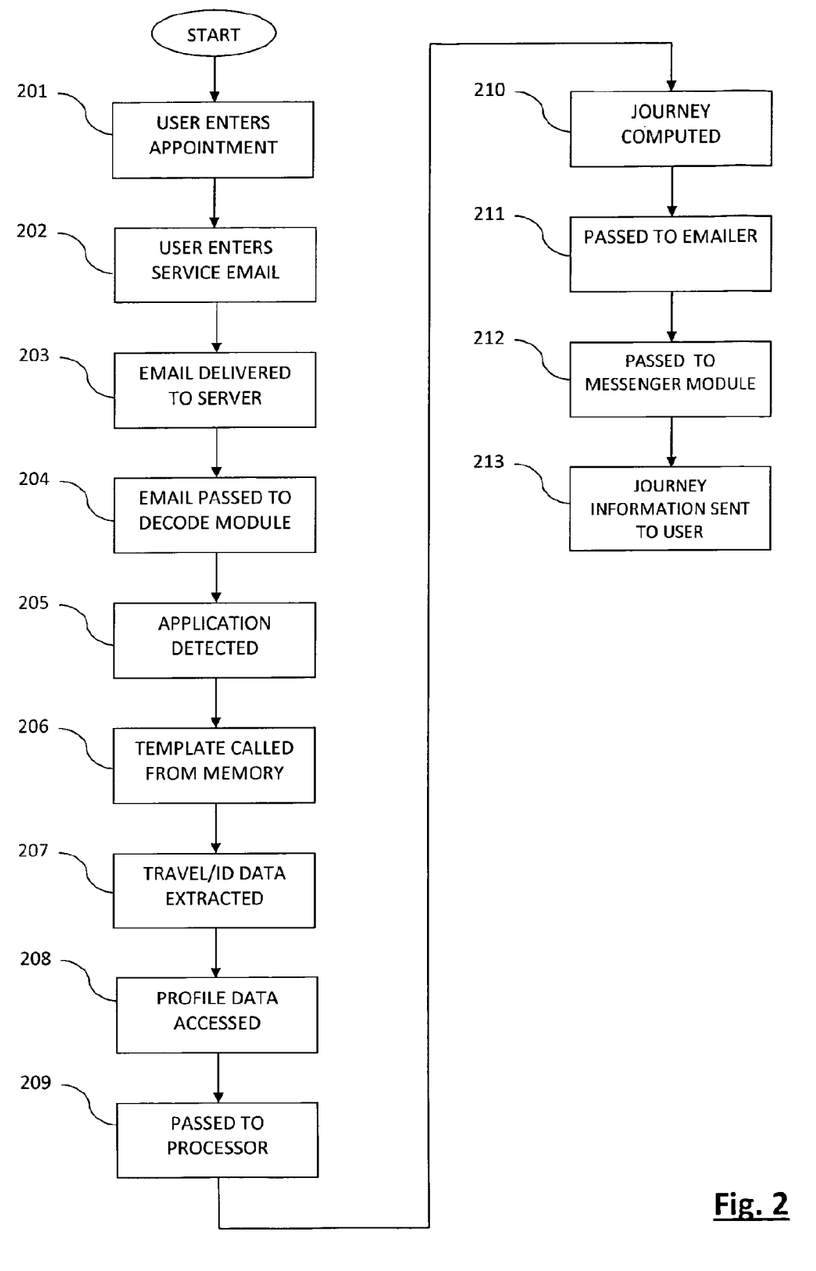
FIG. 2 illustrates a typical process carried out by the journey information server according to an embodiment of the present invention.

FIG. 2 illustrates a typical process carried out by the traffic information server 10 according to an embodiment of the present invention. The process starts with a user entering 201 appointment information, for example, in an e-mail client running on a desktop computer or mobile device. Typically this information will comprise at least: time, date, place, duration and participants, along with any other information. The user enters 202 at least the server e-mail address as a recipient before sending out the appointment invitation or acceptance e-mail. The server e-mail address ensures that the e-mail is delivered 203 to the interface 101 of the traffic information server 10. The e-mail is then passed 204 to the decode module 103. From the e-mail, the decode module 103 is able to automatically detect 205 the application from which the e-mail was sent. The decode module 103 then accesses the database 113 and calls 206 up the relevant template for the application from which the message was sent. As described above, templates describes at least how appointment information is structured within the e-mail message and thus the decode module 103 is able to use this structure to identify and extract 207 travel information from the e-mail. According to one embodiment, the decode module 103 does not automatically detect the application from which the e-mail was sent but instead cross-references the e-mail with templates in template archive 117 until a format match is found.

At the same time, the decode module 103 extracts 207 user identity information (user ID) from the e-mail message. The decode module 103 then accesses the database 113 and calls up the relevant user profile corresponding to the detected user ID. Relevant profile data is then accessed 208 by the decode module 103. Relevant profile data means anything which can be used by the travel information processor to provide useful traffic and/or travel data back to the user. Most typically, relevant profile data includes a starting address, for instance, a home or office address. It may also include information such as: preferred method of transport, cost preferences, environmental preferences or any other information which can be taken into account by the travel information processor 105, in order to produce the most relevant data back to the user.

According to one embodiment, the decode module 103 is able to recognize multiple user IDs from a single message, i.e. where there are multiple recipients, and process different journeys for each recipient based on each recipient's user profile.

The travel information extracted from the e-mail message by the decode module 103 and any relevant user profile information is then passed 209 to the travel information processor 105 for processing. The travel information processor 105 computes 210 a journey based on the information provided to it by the decode module 103. This journey computation involves the travel information processor 105 sending the travel information from the decode module 103 to one or more travel information sources 30 via interface 107. The travel information processor 105 then receives relevant data from the one or more travel information sources 30 and uses this data to compute at least one viable journey. Thus, the at least one computed journey may be a result of the data received from any travel information source 30, and may be a conglomeration of several sources of data.

According to one embodiment, the travel information processor 105 calculates the quickest and/or shortest journey. According to one embodiment, the travel information processor 105 calculates several alternative journeys. According to one embodiment, the travel information processor 105 calculates the most economic journey.

The computed journey, or multiple journeys, is then passed 211 to E-mailer 109. Optionally, it may also be passed 212 to messenger module 111. In both cases, journey information is sent 213 back to the user through network 60 via interface 101. According to one embodiment, the user can specify to what device journey information is delivered, e.g. whether it is back to the e-mail account or to a mobile device. This type of preference information may be stored in the user's profile in user profile archive 117.

According to one embodiment, the travel information processor 105 continues to recalculate journey information until the user has completed the journey. For example, the travel information processor 105 may receive constant travel information updates from any of the travel information sources 30, e.g. traffic data, train/underground delays, flight delays etc., and relay these back to the user via network 60, i.e. to the user's desktop computer 40 and/or mobile device 50, in order to provide the user with the most up-to-date journey information.

The various apparatus modules described herein may be implemented using general purpose or application specific computer apparatus. The hardware and software configurations indicated for the purpose of explaining the preferred embodiment should not be limiting. Similarly, the software processes running on them may be arranged, configured, or distributed in any manner suitable for performing the invention as defined in the claims.

A skilled reader will appreciate that, while the foregoing has described what is considered to be the best mode, and where appropriate, other modes of performing the invention, the invention should not be limited to the specific apparatus configurations or method steps disclosed in this description of the preferred embodiment. Those skilled in the art will also recognize that the invention has a broad range of applications, and the embodiments admit of a wide range of modifications without departing from the inventive concepts.

The invention claimed is:

1. A journey information computer system comprising:
   a non-transitory computer-readable medium comprising instructions;
   an interface configured to receive a calendar email invitation comprising appointment details, identity information of a recipient of the calendar email invitation and second identity information of a second recipient of the calendar email invitation;
   a decode module operable to receive the calendar email invitation, cross-reference the calendar email invitation with templates in a template archive to identify a first template with a matching format, and decode the calendar email invitation by extracting the identity information and the appointment details from the calendar email invitation based upon the first template;

a library of user profiles, each user profile comprising an address, wherein the decode module is configured to use the identity information to look up a first address from a first user profile of a user and define a starting point as the first address and use the second identity information to look up a second address from a second user profile of a second user and define a second starting point as the second address;

a travel information processor configured to execute the instructions to compute:
 a journey with the starting point based on the appointment details together with data received from at least one travel information source;
 a return journey based on a duration extracted from the appointment details, wherein the return journey starts from a finishing point of the journey and ends at the starting point;
 a second journey with the second starting point based on the appointment details together with data received from at least one travel information source; and
 a second return journey based on the duration extracted from the appointment details, wherein the second return journey starts from a second finishing point of the second journey and ends at the second starting point,
 wherein the travel information processor takes into consideration economic factors and outputs the most cost-effective journey; and a communication module configured to:
 send the journey and the return journey to a device identified as being a preferred device for delivery from amongst two or more devices of the user in the user profile; and
 send the second journey and the second return journey to a second device identified as being a preferred device for delivery from amongst two or more devices of the second user in the second user profile.

2. The system according to claim 1 wherein the decode module is configured to process the appointment details to generate a travel information data packet comprising at least a starting point and finishing point for one or more journeys, and the identity information.

3. The system according to claim 2 wherein the travel information processor receives the travel information data packet and uses it to compute the journey.

4. The system according to claim 1 wherein the first address is one or more of a home address or a work address.

5. The system according to claim 4 wherein the recipient is prompted to select between the home and work address.

6. The system according to claim 1 wherein the appointment details comprise: date, time, and location.

7. The system according to claim 6 wherein the decode module is configured to define the location from the appointment details as the finishing point.

8. The system according to claim 1 wherein the decode module is configured to extract the duration from the appointment details.

9. The system according to claim 1 wherein each template in the template archive describes a structure of appointment details in e-mails.

10. The system of claim 1 wherein each user profile comprises more than one address and a sender is prompted with a message to confirm at least one of the starting point or the finishing point.

11. The system of claim 1 wherein each user profile comprises preference information used by the travel information processor for journey computations.

12. The system according to claim 11 wherein the preference information comprises one or more of: preferred method of transport, cost preferences, or environmental preferences.

13. The system according to claim 1 wherein the identity information comprises an e-mail address.

14. The system according to claim 1 comprising an e-mailer module for creating an email message comprising details of the journey and sending it to the device.

15. The system according to claim 14 wherein the email message comprises at least one of updates or reminders regarding the journey.

16. The system according to claim 1 comprising a messenger module for creating a SMS/MMS message comprising details of the journey and sending it to the device.

17. The system according to claim 1 wherein the device is one or more of: a desktop computer, a mobile phone, a smart-phone, or a PDA.

18. The system according to claim 1 wherein the at least one travel information source used to compute the journey comprises one or more of: real-time traffic information; rail information; flight information; coach information; local taxi companies; or public transport schedules.

19. The system according to claim 1 wherein travel information is sent as regular updates to the recipient by at least one of an e-mailer module or a messenger module, and wherein the travel information is sent at least one of before or during the journey.

20. The system according to claim 1 wherein the at least one travel information source used to compute the second journey comprises one or more of: real-time traffic information; rail information; flight information; coach information; local taxi companies; or public transport schedules.

21. The system according to claim 1 wherein the travel information processor takes into consideration environmental factors and outputs the most environmentally friendly journey.

22. The system according to claim 1 wherein the journey allows a predetermined amount of time for parking.

23. The system according to claim 1 comprising an interface configured to present parking availability in the vicinity of the finishing point.

24. The system according to claim 1 wherein the decode module sends an instruction to a module to send a registration link to a third user, and the third user completes profile information which is used to create a third user profile.

25. A method, comprising:
 receiving a calendar email invitation comprising appointment details, identity information of a recipient of the calendar email invitation and second identity information of a second recipient of the calendar email invitation;
 cross-referencing the calendar email invitation with templates in a template archive to identify a first template with a matching format;
 extracting the identity information and the appointment details from the calendar email invitation based upon the first template;

using the identity information to look up a first address from a first user profile of a user in a library of user profiles and defining a starting point as the first address;

using the second identity information to look up a second address from a second user profile of a second user in the library of user profiles and defining a second starting point as the second address;

receiving travel information from at least one travel information source;

computing at journey with the starting point based on the appointment details and the travel information using a travel information processor;

computing a return journey based on a duration extracted from the appointment details, wherein the return journey starts from a finishing point of the journey and ends at the starting point;

computing a second journey with the second starting point based on the appointment details and the travel information using the travel information processor;

computing a second return journey based on the duration extracted from the appointment details, wherein the second return journey starts from a second finishing point of the second journey and ends at the second starting point, wherein the travel information processor takes into consideration one or more factors including zero or more economic information and outputs the most cost-effective journey;

sending the journey and the return journey to a device identified as being a preferred device for delivery from amongst two or more devices of the user in the user profile; and sending the second journey and the second return journey to a second device identified as being a preferred device for delivery from amongst two or more devices of the second user in the second user profile.

26. The method according to claim 25 comprising using the appointment details to generate a travel information data packet comprising at least a starting point and finishing point for one or more journeys, and the identity information.

27. The method according to claim 26 comprising receiving the travel information data packet and using it in the computation of the journey.

28. The method according to claim 25 wherein the appointment details comprise: date, time, direction and location.

29. The method according to claim 28 comprising using the location as the finishing point for the journey.

30. The method according to claim 25 comprising extracting the duration from the appointment details.

31. The method according to claim 25 wherein each template in the template archive describes where an e-mail client application places appointment details in e-mails.

32. The method according to claim 25 wherein each user profile comprises more than one address and a sender is prompted with a message to confirm at least one of the starting point or the finishing point.

33. The method according to claim 25 wherein user profiles comprise preference information used by the travel information processor for journey computations.

34. The method according to claim 33 wherein the preference information comprises one or more of: preferred method of transport, cost preferences, or environmental preferences.

35. The method according to claim 25 wherein the identity information comprises an e-mail address.

36. The method according to claim 25 comprising creating an email message comprising the journey and sending it to the device.

37. The method according to claim 36 wherein the email message comprises at least one of updates or reminders regarding the journey.

38. The method according to claim 25 comprising creating a SMS/MMS message comprising the journey and sending it to the device.

39. The method according to claim 25 wherein the device is one or more of: a desktop computer, a mobile phone, a smartphone, or a PDA.

40. The method according to claim 25 wherein the at least one travel information source comprises one or more of: real-time traffic information, rail information, flight information, coach information, local taxi companies, or public transport schedules.

41. The method according to claim 25 comprising sending regular traffic information updates to the recipient before and during the journey.

42. The method according to claim 25 wherein the second device is one or more of: a desktop computer, a mobile phone, a smartphone, or a PDA.

43. The method according to claim 25 wherein the travel information processor takes into consideration environmental factors and outputs the most environmentally friendly journey.

44. The method according to claim 25 wherein the journey allows a predetermined amount of time for parking.

45. The method according to claim 25 comprising sending a registration link to a third user.

46. A non-transitory computer-readable medium comprising instructions that, when executed by a processor, cause the processor to:

receive a calendar email invitation comprising appointment details, identity information of a recipient of the calendar email invitation and second identity information of a second recipient of the calendar email invitation;

cross-reference the calendar email invitation with templates in a template archive to identify a first template with a matching format;

extract the identity information and the appointment details from the calendar email invitation based upon the first template;

use the identity information to look up a first address from a first user profile of a user in a library of user profiles and define a starting point as the first address;

use the second identity information to look up a second address from a second user profile of a second user in the library of user profiles and define a second starting point as the second address;

compute at journey with the starting point based on the appointment details together with data received from at least one travel information source, wherein the computing takes into consideration economic factors and outputs the most cost-effective journey;

compute a return journey based on a duration extracted from the appointment details, wherein the return journey starts from a finishing point of the journey and ends at the starting point;

compute a second journey with the second starting point based on the appointment details together with data received from at least one travel information source;

compute a second return journey based on the duration extracted from the appointment details, wherein the second return journey starts from a second finishing point of the second journey and ends at the second starting point;
send at least one of the journey or the return journey to a device identified as being a preferred device of the user in the user profile; and
send at least one of the second journey or the second return journey to a second device identified as being a preferred device of the second user in the second user profile.

* * * * *

UNITED STATES PATENT AND TRADEMARK OFFICE
CERTIFICATE OF CORRECTION

PATENT NO. : 9,798,985 B2  Page 1 of 1
APPLICATION NO. : 13/147540
DATED : October 24, 2017
INVENTOR(S) : Jonathan Charles Burr et al.

It is certified that error appears in the above-identified patent and that said Letters Patent is hereby corrected as shown below:

On the Title Page

In item (56) titled Other Publications, on page 3, please replace the following:
"Written Opinion of the International Searching Authority issued in Interntational Patent Application No. PCT/GB2005/002637"
With:
"Written Opinion of the International Searching Authority issued in International Patent Application No. PCT/GB2005/002637, dated September 21, 2005"

In the Claims

Column 11, Line 10, please delete the word "at" and insert therefor the word --a--

Column 12, Line 54, please delete the word "at" and insert therefor the word --a--

Signed and Sealed this
Twenty-third Day of January, 2018

Joseph Matal
*Performing the Functions and Duties of the
Under Secretary of Commerce for Intellectual Property and
Director of the United States Patent and Trademark Office*